(12) United States Patent
Maruichi et al.

(10) Patent No.: US 7,325,151 B2
(45) Date of Patent: Jan. 29, 2008

(54) PROGRAM, RECORDING MEDIUM, METHOD, AND INFORMATION PROCESSING APPARATUS FOR CONTROLLING AN EXECUTION MODE OF A CPU

(75) Inventors: Tomoki Maruichi, Redmond, WA (US);
Yuhko Ohmori, Sagamihara (JP);
Atsuo Sugiura, Yamato (JP); Noritoshi Yoshiyama, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 422 days.

(21) Appl. No.: 11/060,474

(22) Filed: Feb. 17, 2005

(65) Prior Publication Data

US 2005/0210312 A1     Sep. 22, 2005

(30) Foreign Application Priority Data

Feb. 18, 2004   (JP)   ............... 2004-042147

(51) Int. Cl.
*G06F 1/26* (2006.01)
*G06F 1/30* (2006.01)
*G06F 1/32* (2006.01)

(52) U.S. Cl. ................ 713/323; 713/324; 713/330

(58) Field of Classification Search ........... 713/323, 713/324, 330
See application file for complete search history.

(56) References Cited

U.S. PATENT DOCUMENTS 5,999,730 A * 12/1999 Lewis ................ 717/109
6,934,199 B2 * 8/2005 Johnson et al. .......... 365/194
6,941,480 B1 * 9/2005 Dai ..................... 713/320
7,149,915 B2 * 12/2006 Matsuoka et al. ....... 713/320
2005/0149768 A1 * 7/2005 Kwa et al. .............. 713/300

FOREIGN PATENT DOCUMENTS

JP    08-006881    1/1996

\* cited by examiner

*Primary Examiner*—James K Trujillo
(74) *Attorney, Agent, or Firm*—John L. Rogitz

(57) ABSTRACT

Disclosed is a program product for directing the information processing apparatus to control an execution mode of a central processing unit(CPU) provided, the CPU having a plurality of execution modes, whose types and power consumptions of executable processing are different from one another, the program product comprising: an apparatus readable medium; recovery time acquisition means for acquiring a recovery time which is a time required for the CPU to recover from a low power mode to a high power mode of which power consumption is higher than that of the low power mode; allowed time acquisition means for acquiring the longest allowed time from a request for processing unprocessable in the low power mode and processable in the high power mode to a start of the processing after the CPU recovers to the high power mode, the request being made by an input/output device; and execution mode setting means for settingthe CPU in a state of being shiftable to the low power mode if it is determined that the CPU is able to shift to the low power mode based on the allowed time and the recovery time.

15 Claims, 14 Drawing Sheets

FIG.2

| EXECUTION MODE | OUTLINE |
|---|---|
| C0 | EXECUTION MODE OF EXECUTING COMMAND |
| C1 | EXECUTION MODE OF PERFORMING COHERENCY CONTROL OF CACHE MEMORY WITHOUT EXECUTING COMMAND |
| C2 | EXECUTION MODE IN WHICH CLOCK INSIDE CENTRAL PROCESSING UNIT IS STOPPED WHILE CONTINUING TO SUPPLY THE CLOCK TO CENTRAL PROCESSING UNIT |
| C3 | EXECUTION MODE IN WHICH CLOCK FOR CENTRAL PROCESSING UNIT IS STOPPED |
| C4 | EXECUTION MODE IN WHICH POWER SUPPLY VOLTAGE OF CENTRAL PROCESSING UNIT IS LOWERED WHILE CONTINUING TO STOP CLOCK FOR CENTRAL PROCESSING UNIT |

| EXECUTION MODE | CPU RECOVERY TIME | BUS RECOVERY TIME |
| --- | --- | --- |
| C1 | 0 | 0 |
| C2 | 1 μS | 0 |
| C3 | 85 μS | 85 μS |
| C4 | 120 μS | 120 μS |

310

| INPUT/OUTPUT DEVICE | CPU ALLOWED TIME | BUS ALLOWED TIME |
| --- | --- | --- |
| DEVICE A | 9999 μS | 9999 μS |
| DEVICE B | 500 μS | 200 μS |
| ⋮ | ⋮ | ⋮ |
| INFRARED COMMUNICATION DEVICE | 100 μS | 50 μS |
| USB DEVICE | 800 μS | 3000 μS |
| ⋮ | ⋮ | ⋮ |

FIG.4
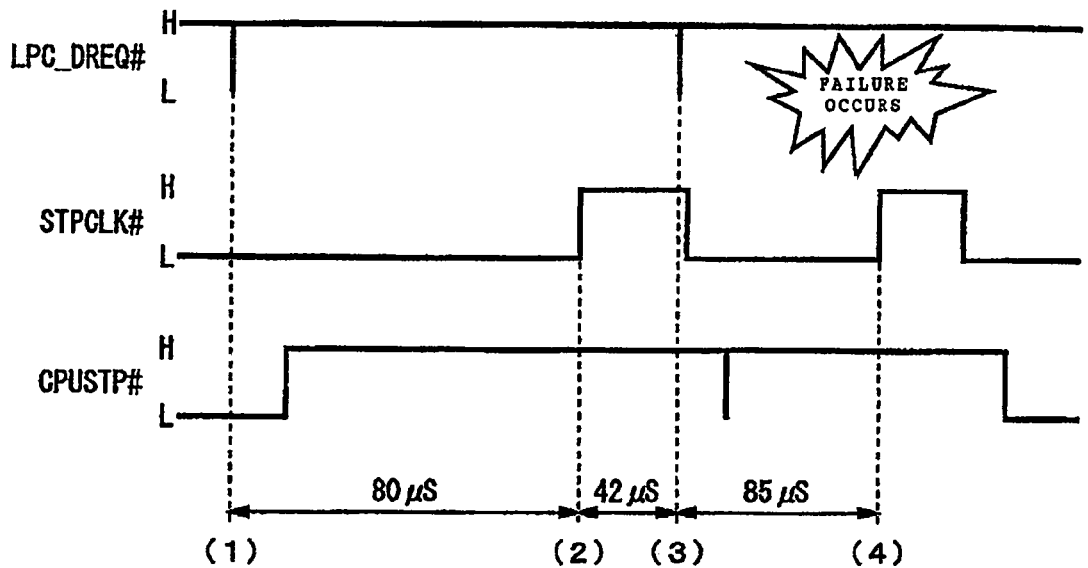
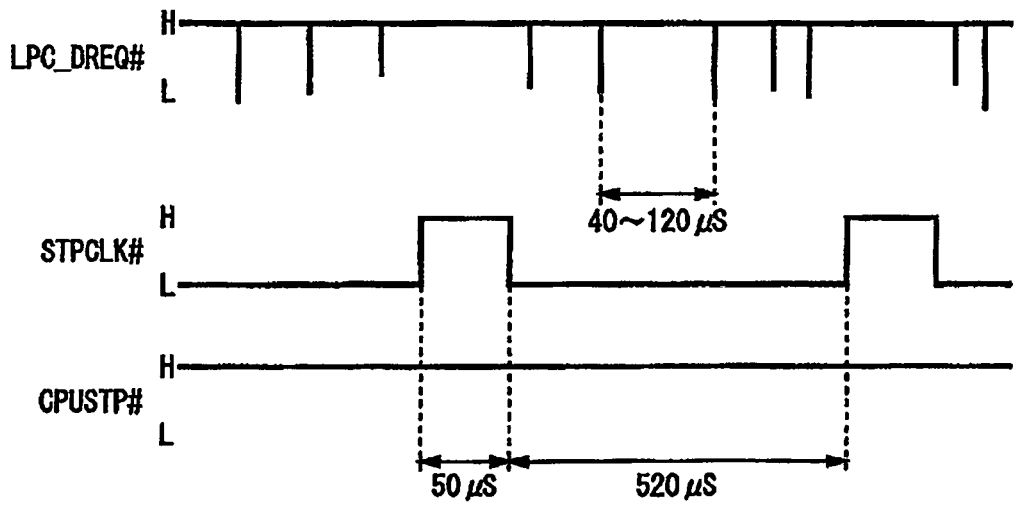

FIG.11

| INPUT/OUTPUT DEVICE | SHIFT DESTINATION MODE |
|---|---|
| DEVICE A | C4 |
| DEVICE B | C3 |
| ⋮ | ⋮ |
| INFRARED COMMUNICATION DEVICE | C2 |
| USB DEVICE | C3 |
| ⋮ | ⋮ |

310

PROGRAM, RECORDING MEDIUM, METHOD, AND INFORMATION PROCESSING APPARATUS FOR CONTROLLING AN EXECUTION MODE OF A CPU

BACKGROUND OF THE INVENTION

The present invention relates to a program, a recording medium, a control method, and an information processing apparatus. In particular, the present invention relates to a program, a recording medium, a control method, and an information processing apparatus, which relate to power saving of a central processing unit.

In recent years, a power saving technology for reducing power consumption of an information processing apparatus by disabling at least a part of functions of a central processing unit has attracted attention. For example, a certain central processing unit has a C0 state which is a normal execution mode, a C2 state in which an internal clock of the central processing unit is stopped, and a C3 state in which coherency control between a cache memory and a main memory is further disabled in the C2 state.

Moreover, in the information processing apparatus in recent years, an input/output device can perform bus master transfer which directly accesses the main memory without requesting processing to the central processing unit. Owing to the bus master transfer, the central processing unit does not receive interrupt processing more than necessary from the input/output device, and accordingly, operates efficiently.

However, in the case where the input/output device performs the bus master transfer when the central processing unit is in the C3 state, coherency of data between the cache memory and the main memory is lost. Hence, an operating system (hereinafter, referred to as an "OS") of the central processing unit has shifted the central processing unit to the C3 state only when verifying that the bus master transfer is not being performed.

For example, an OS such as Windows XP (registered trademark) has reset a flag indicating that the bus master transfer is under processing, and if the flag remains in a reset state as a result of referring to the flag immediately thereafter, the OS has determined that frequency of the bus master transfer is low, and shifted the central processing unit to the C3 state. Then, when the bus master transfer is resumed, it has been necessary for the central processing unit to recover immediately from the C3 state to the C0 state and the like.

A prior art for performing power saving control has been proposed (refer to Patent Document 1).

[Patent Document 1] Japanese Patent Laid-Open No. Hei 8(1996)-6681

However, it takes some time for the central processing unit to recover to the C0 state and the like. For this reason, during a period from a request for an access to the main memory and the like to a time when the central processing unit recovers to the C0 state and resumes the processing, the input/output device has not been able to access the main memory and caused a failure in some cases.

For example, in order to communicate with another device at a constant speed, a communication device acquires data to be communicated from the main memory in advance and stores the data in a buffer memory. Then, when the data stored in the buffer memory becomes insufficient, the communication device requests an access to the main memory for the purpose of newly acquiring data from the main memory. When the data in the buffer memory is depleted during a period from this request to a time when the communication device acquires the data from the main memory, the communication device cannot constantly maintain the communication speed, and causes a failure.

In this connection, it is an object of the present invention to provide a program, a recording medium, a control method, and an information processing apparatus, which are capable of solving the above-described problem. This object is achieved by combinations of features described in independent claims in the scope of claims.

SUMMARY OF THE INVENTION

In order to solve the above-described problem, a first aspect of the present invention is a program product, for use with an information processing apparatus, for directing the information processing apparatus to control an execution mode of a central processing unit provided in a the information processing apparatus, the central processing unit having a plurality of execution modes, whose types and power consumptions of executable processing are different from one another, the program product comprising: an apparatus readable medium; recovery time acquisition means, provided on the apparatus-readable medium, for acquiring a recovery time which is a time required for the central processing unit to recover from a low power mode to a high power mode of which power consumption is higher than that of the low power mode; allowed time acquisition means, provided on the apparatus-readable medium, for acquiring the longest allowed time from a request for processing unprocessable in the low power mode and processable in the high power mode to a start of the processing after the central processing unit recovers to the high power mode, the request being made by an input/output device of the information processing apparatus to the central processing unit; and execution mode setting means, provided on the apparatus-readable medium, for setting the central processing unit in a state of being shiftable to the low power mode, on condition that it is determined that the central processing unit is able to shift to the low power mode based on the allowed time and the recovery time.

Note that the above-described summary of the invention is not one listing all necessary features of the present invention, and subcombinations of groups of these features can also be incorporated in the invention.

According to the present invention, the input/output device which performs the bus master transfer can be operated appropriately.

BRIEF DESCRIPTION OF THE DRAWINGS

For a more complete understanding of the present invention and the advantages thereof, reference is now made to the following description taken in conjunction with the accompanying drawings.

FIG. 2 shows outlines of execution modes of a central processing unit 1000.

FIG. 3 shows an example of a data structure of data stored in a main memory 1020.

FIGS. 4(a) and 4(b) are charts showing examples of transition timing of processing and execution modes of an input/output device.

FIG. 11 shows an example of a device information recording unit 310 in the modification example.

DETAILED DESCRIPTION OF THE PREFERRED EMBODIMENT

The present invention is described below through an embodiment thereof. However, the embodiment described below is not one limiting the invention according to the scope of claims, and not all combinations of features described in the embodiment are always essential to the solving means of the invention.

Figure 1:
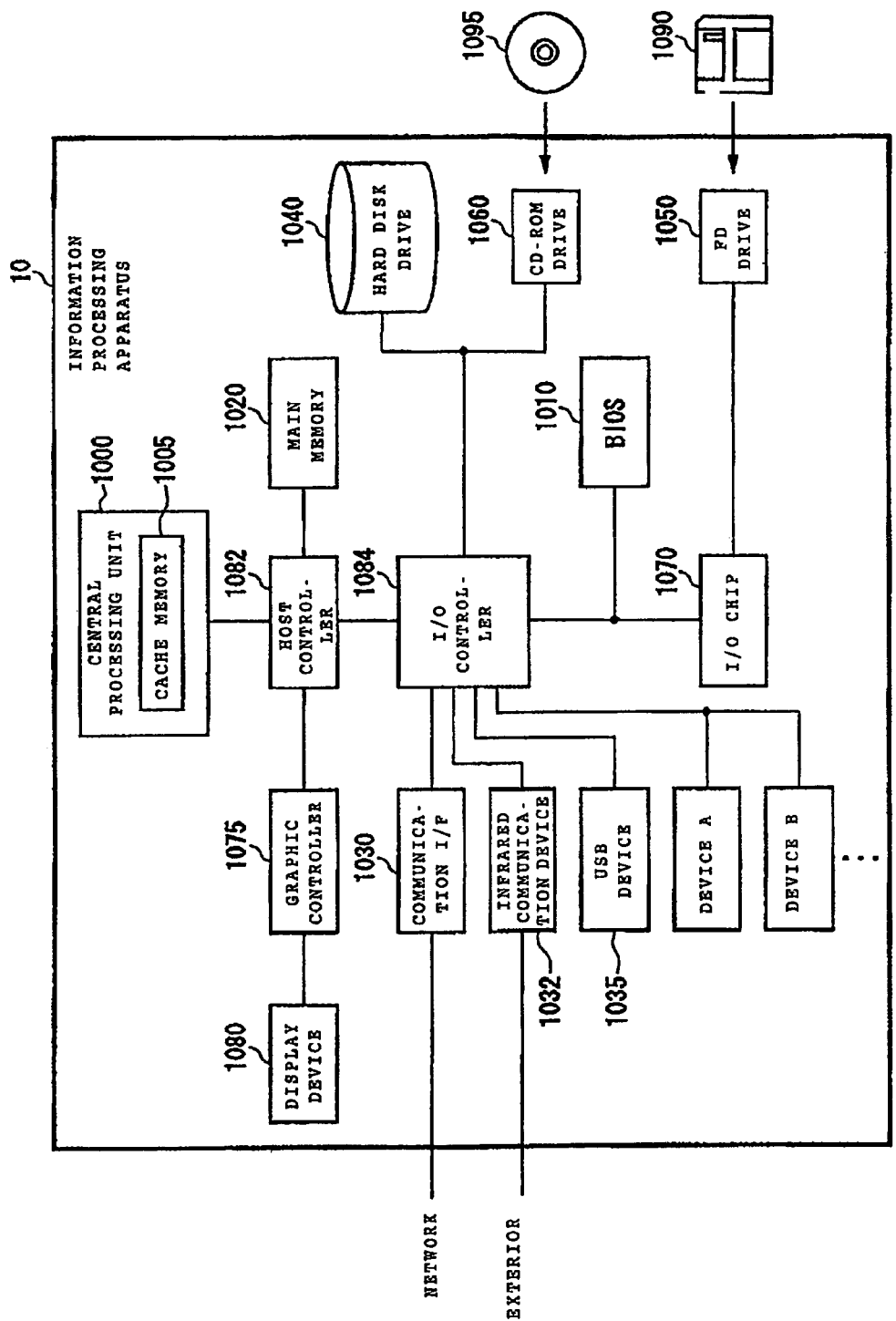
FIG. 1 shows a block diagram of an information processing apparatus 10.

FIG. 1 shows an example of a hardware configuration of an information processing apparatus 10. The information processing apparatus 10 includes a central processing unit and peripheral units thereof, which are interconnected through a host controller 1082, input/output units connected to the host controller 1082 by an I/O controller 1084, and legacy input/output units connected to the I/O controller 1084. The central processing unit and the peripheral units thereof include a central processing unit 1000, a main memory 1020, a graphic controller 1075, and a display device 1080.

The input/output units include a communication interface 1030, an infrared communication device 1032, a USB device 1035, devices A and B and the like which are other input/output devices, a hard disk drive 1040, and a CD-ROM drive 1060. The legacy input/output units include a BIOS 1010, a flexible disk drive 1050, and an I/O chip 1070.

The host controller 1082 connects the main memory 1020 to the central processing unit 1000 and the graphic controller 1075 which access the main memory 1020 at high transfer rates. The central processing unit 1000 operates based on programs stored in the BIOS 1010 and the main memory 1020, and controls the respective units.

The graphic controller 1075 acquires image data which the central processing unit 1000 and the like create on a frame buffer provided in the main memory 1020, and displays the acquired image data on the display device 1080. In place of this, the graphic controller 1075 may include therein the frame buffer storing the image data which the central processing unit 1000 and the like create.

The I/O controller 1084 connects the host controller 1082 to the communication interface 1030, the infrared communication device 1032, the USB device 1035, the devices A/B, the hard disk drive 1040, and the CD-ROM drive 1060 which are relatively high-speed input/output devices. The communication interface 1030 communicates with an external device through a network.

The infrared communication device 1032 communicates wirelessly with an external device by an infrared communication technology. The USB device is a device which conforms with the USB standard, and reads and writes data from/to the main memory 1020. The hard disk drive 1040 stores programs and data to be used by the information processing apparatus 10. The CD-ROM drive 1060 reads a program or data from a CD-ROM 1095, and provides the read program or data to the main memory 1020 through the I/O controller 1084.

Moreover, relatively low-speed input/output devices such as the BIOS 1010, the flexible disk drive 1050 and the I/O chip 1070 are connected to the I/O controller 1084. The BIOS 1010 stores a boot program to be executed by the central processing unit 1000 when the information processing apparatus 10 is activated, a program depending on the hardware of the information processing apparatus 10, and the like.

The flexible disk drive 1050 reads a program or data from a flexible disk 1090, and provides the read program or data to the main memory 1020 through the I/O chip 1070. The I/O chip 1070 connects the flexible disk 1090 and a variety of input/output devices to the I/O controller 1084 through, for example, a parallel port, a serial port, a keyboard port and a mouse port.

The programs to be provided to the information processing apparatus 10 are stored in a recording medium such as the flexible disk 1090, the CD-ROM 1095 and an IC card, and are provided by a user. The programs are read from the recording medium through the I/O chip 1070 and/or the I/O controller 1084, installed in the information processing apparatus 10, and executed thereby.

The programs to be installed in the information processing apparatus 10 and to be executed thereby include an allowed time creating module, a recovery time acquisition module, an allowed time acquisition module, a failure detection module, an execution mode setting module, and an execution mode selection module. Actions which the respective modules allow the information processing apparatus 10 to perform by acting thereon are the same as actions of members corresponding to the modules in the information processing apparatus 10, which are described in FIGS. 2 to 14, and accordingly, description thereof is omitted.

The programs or modules described above may be stored in an external storage medium. As such a storage medium, an optical recording medium such as a DVD and a PD, a magneto-optical recording medium such as an MD, a tape medium, a semiconductor memory such as an IC card, and the like can be used besides the flexible disk 1090 and the CD-ROM 1095. Moreover, a storage device such as a hard disk and a main memory provided in a server system connected to a private communication network and the Internet may be used as such a recording medium, and the programs may be provided to the information processing apparatus 10 through the networks.

FIG. 2 shows outlines of execution modes of the central processing unit 1000. The central processing unit 1000 has a plurality of execution modes, whose types and power consumptions of executable processing are different from one another. As an example, the central processing unit 1000 has a C0 state, a C1 state, a C2 state, a C3 state, and a C4 state as the plurality of execution modes.

The power consumptions of the C0 state to the C4 state become higher in descending order. For example, in a certain type of central processing unit, while the power consumption of the C0 state exceeds 20 W, the power consumptions of the C1 state, the C2 state, the C3 state and the C4 state are 0.8 W, 0.69 W, 0.26 W and 0.1 W, respectively.

The C0 state is an example of a high power mode according to the present invention, and in the C0 state, the central processing unit 1000 executes an instruction. As opposed to this, the C1 to C4 states are examples of low power modes according to the present invention, and in the C1 to C4 states, the central processing unit 1000 does not execute the instruction.

Moreover, in the C0 to C2 states, the central processing unit 1000 performs coherency control which is processing for keeping coherency between the cache memory 1005 and the main memory 1020. As opposed to this, in the C3 and C4 states, the central processing unit 1000 does not perform this coherency control. For example, the central processing unit 1000 performs bus snoop processing for monitoring an accessing bus of the main memory in the C0 to C2 states, and does not perform the bus snoop processing in the C3 and C4 states.

Moreover, in the C2 state, the central processing unit 1000 stops an operating clock inside the central processing unit 1000 while continuing to receive a supply of an operating clock. In the C3 state, the central processing unit 1000 further stops the operating clock outside the central processing unit 1000. Then, in the C4 state, the central processing unit 1000 lowers a power supply voltage of the central processing unit 1000 than in the C3 state.

FIG. 3 shows an example of a data structure of data stored in the main memory 1020. The main memory 1020 includes a CPU information recording unit 300, and a device information recording unit 310. The CPU information recording unit 300 stores a recovery time which is a time required for the central processing unit 1000 to recover from each of the plurality of low power modes to the high power mode.

However, a time required for the central processing unit 1000 to recover from a state of a low power mode to the state of being capable of executing an instruction and a time required therefor to recover to the state of being capable of the coherency control differ from each other. Hence, for each of the low power modes, the CPU information recording unit 300 stores a CPU recovery time which is the time required therefor to recover from the low power mode to the state of being capable of executing the instruction, and a bus recovery time which is the time required therefor to recover from the low power mode to the state of being capable of the coherency control. Alternatively, the bus recovery time may be a time required for the input/output device to recover from a low power mode to a state of being capable of acquiring a right to control a bus which accesses the main memory.

As an example, the CPU information recording unit 300 stores 85 s as a CPU recovery time required to recover from the C3 state to the state of being capable of executing an instruction. Meanwhile, the CPU information recording unit 300 stores 1 s as a CPU recovery time required to recover from the C2 state to the state of being capable of executing an instruction. Note that these recovery times may be values obtained as a result of a user program inquiring to an operating system by an API for ACPI, or values measured by the user.

For each of the input/output devices, the device information recording unit 310 stores a CPU allowed time which is the maximum allowed time from a time when the input/output device requests the central processing unit 1000 to execute an instruction to the time when the central processing unit 1000 actually recovers to the C0 state and executes the instruction. Furthermore, for each of the input/output devices, the device information recording unit 310 stores a bus allowed time which is the maximum allowed time from a time when the input/output device requests an access to the main memory 1020 to the time when the central processing unit 1000 turns into the state of being capable of the coherency control.

Note that allowed times which the device information recording unit 310 stores are not limited to CPU allowed times and bus allowed times. It is satisfactory if the device information recording unit 310 stores an allowed time from a time when an input/output device requests the central processing unit 1000 to execute processing unprocessable in the low power mode and processable in the high power mode to a time when the central processing unit 1000 actually starts the processing. Moreover, the bus allowed time which the device information recording unit 310 stores is not limited to the time required for the central processing unit 1000 to recover to the C0 state. For example, if the central processing unit 1000 is shiftable from the C3 state and the like to the C2 state without passing through the C0 state, the device information recording unit 310 may store a time required for the central processing unit 1000 to recover from the C3 state to the C2 state as a bus allowed time.

FIGS. 4(*a*) and 4(*b*) are charts showing examples of transition timing of the processing and execution modes of an input/output device. FIG. 4(*a*) shows an example of timing in a state where the central processing unit 1000 operates in either the C0 state or the C3 state. In the C3 state, when the input/output device requests an access to the main memory by asserting an LPC_DREQ# signal (1), the central processing unit 1000 starts recovery processing from the C3 state to the C0 state.

Specifically, first, the information processing apparatus 10 deasserts a CPUSTP# signal, and thus the central processing unit 1000 starts preparation for receiving a supply of an operating clock. For this preparation, it takes time of, for example, approximately 80 s. Then, the information processing apparatus 10 deasserts a STPCLK# signal, and thus resumes the operating clock. Thus, the information processing apparatus 10 recovers to the C0 state (2), and processes the request of the bus master device.

In this example, if the central processing unit 1000 does not further detect a request for bus master transfer after operating in the C0 state for 42 s, the central processing unit 1000 shifts to the C3 state one more time (3). At the substantially same time as this processing, for example, the infrared communication device 1032 requests an access to the main memory. The information processing apparatus 10 starts recovery processing to the C0 state immediately at a moment of asserting the CPUSTP# and shifting to the C3 state. For this recovery processing, it takes a time of, for example, approximately 85 s (4).

When the data in the buffer memory provided in the infrared communication device 1032 is depleted within 85 s from the time when the infrared communication device 1032 requests the access to the main memory, the infrared communication device 1032 causes a failure due to insufficiency of data acquired from the main memory. In such a case, the information processing apparatus 10 in this embodiment makes a setting of shifting the central processing unit 1000 from the C0 state not to the C3 state but to the C2 state.

FIG. 4(*b*) shows an example of timing in a state where the central processing unit 1000 operates in either the C0 state or the C2 state. In this example, when the central processing unit 1000 does not detect the request to access the main memory, the central processing unit 1000 asserts the STPCLK#, deasserts the CPUSTP#, and thus shifts to the C2 state. Then, when the request to access the main memory is made, the central processing unit 1000 performs the coherency control while continuing to be in the C2 state.

In the example shown in FIG. 4(*b*), unlike the example of FIG. 4(*a*), the infrared communication device 1032 can acquire data without so much delay from the request to access the main memory, and accordingly, can continue communication without causing a failure.

Figure 5:
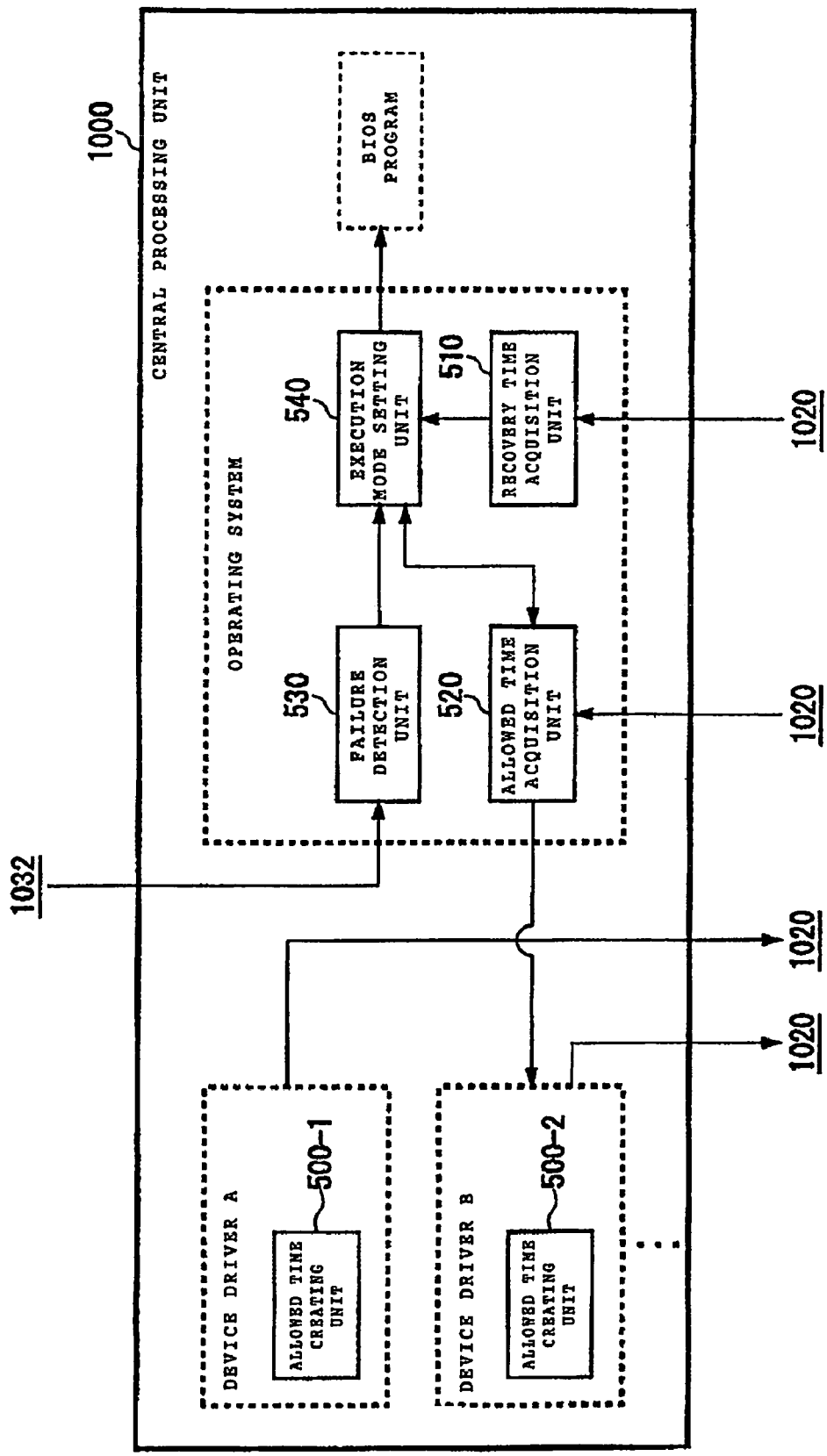
FIG. 5 shows a block diagram of the central processing unit 1000.

FIG. 5 shows a block diagram of the central processing unit 1000. The central processing unit 1000 functions as an allowed time creating unit 500-1 by a device driver A, and functions as an allowed time creating unit 500-2 by a device driver B. Moreover, the central processing unit 1000 functions as a recovery time acquisition unit 510, an allowed time acquisition unit 520, a failure detection unit 530, and an execution mode setting unit 540 by a power saving module of the operating system.

Note that the device driver A is a program for managing the device A, and the device driver B is a program for managing the device B. Then, a set of the operating system, the device driver A and the device driver B is an example of a program according to the present invention.

The allowed time creating unit 500-1 creates a CPU allowed time and a bus allowed time based on an operating state of the device A, and stores the created CPU allowed time and bus allowed time in the device information recording unit 310 of the main memory 1020. Processing by the device driver B is substantially the same as the processing by the device driver A, and accordingly, description thereof is omitted.

The recovery time acquisition unit 510 acquires the CPU recovery time and bus recovery time of each execution mode from the CPU information recording unit 300 of the main memory 1020. The allowed time acquisition unit 520 acquires the CPU allowed time and bus allowed time of each input/output device at times of initialization and change thereof. In place of this, the allowed time acquisition unit 520 may inquire of the device driver B and the like about the CPU allowed time and bus allowed time when a predetermined set reference time has passed since the execution mode setting unit 540 changed an execution mode of a shift destination from a low power mode of which power consumption is low to a low power mode of which power consumption is higher.

The failure detection unit 530 determines whether or not a failure has occurred in data transfer to be performed with the main memory in the low power mode when any of the input/output devices requests the data transfer. As an example, the failure detection unit 530 may detect whether or not the buffer memory of the infrared communication device 1032 has caused an under-run error.

The execution mode setting unit 540 sets the low power mode of the shift destination (hereinafter, referred to as a shift destination mode) to which the central processing unit 1000 is to shift from the C0 state based on the CPU recovery time, the bus recovery time, the CPU allowed time and the bus allowed time (hereinafter, referred to as the CPU recovery time and the like). For example, the execution mode setting unit 540 may set the shift destination mode to the C2 state by setting the central processing unit 1000 so as not to be shiftable to the C3 state. Alternatively, the execution mode setting unit 540 may set a set of execution modes to which the central processing unit 1000 is shiftable. As an example of a setting method, the execution mode setting unit 540 may call a predetermined API for a BIOS program which operates on the central processing unit 1000.

Furthermore, it may be set that when it is determined by the failure detection unit 530 that a failure has occurred, the execution mode setting unit 540 sets the central processing unit 1000 so as not to be shiftable to the C3 state irrespective of the CPU recovery time and the like. In place of this, it may be set that when it is determined that the central processing unit 1000 is not allowed to shift to the C3 state based on the CPU recovery time and the like, the execution mode setting unit 540 sets the central processing unit 1000 so as not to be shiftable to the C3 state further on condition that it is determined by the failure detection unit 530 that a failure has occurred.

Figure 6:
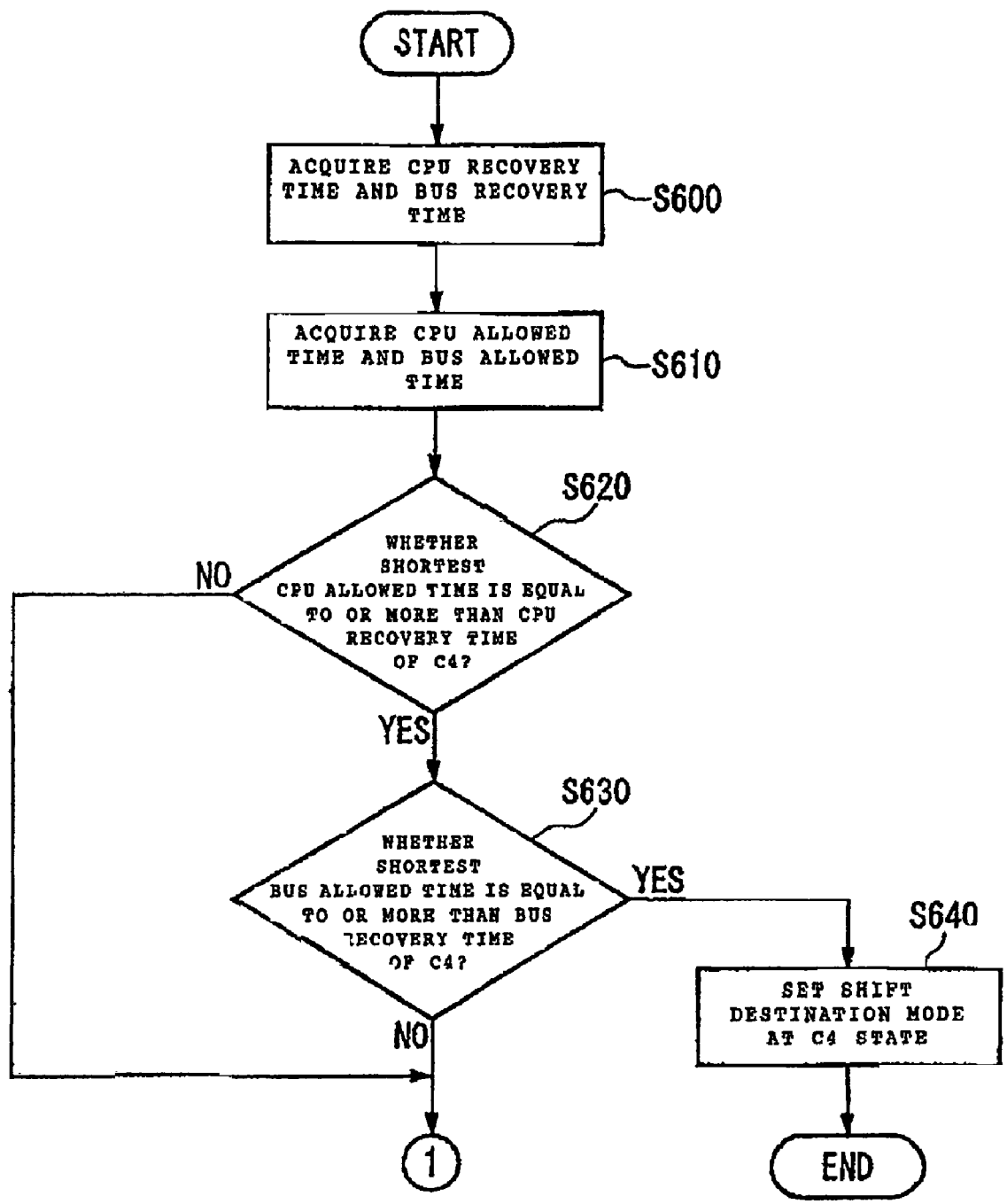
FIG. 6 shows an example of processing where an operating system sets a shift destination mode.

FIG. 6 shows an example of processing where the operating system sets the shift destination mode. The operating system allows the central processing unit 1000 to perform the following processing when the central processing unit 1000 is in an idle state of not executing an instruction of a user program. First, the recovery time acquisition unit 510 acquires the CPU recovery time and the bus recovery time (S600).

The allowed time acquisition unit 520 acquires the CPU allowed time and bus allowed time of each input/output device (S610). Then, the execution mode setting unit 540 determines whether or not the shortest CPU allowed time in the plurality of input/output devices is equal to or more than the CPU recovery time of the C4 state (S620). When the CPU allowed time is equal to or more than the CPU recovery time (S620: YES), the execution mode setting unit 540 subsequently determines whether or not the shortest bus allowed time in the plurality of input/output devices is equal to or more than the bus recovery time of the C4 state (S630).

When the bus allowed time is equal to or more than the bus recovery time (S630: YES), the execution mode setting unit 540 sets the shift destination mode at the C4 state (S640). Note that, in preparation for the processing that follows, preferably, the execution mode setting unit 540 stores a shift destination mode already set before this setting in the main memory and the like. Meanwhile, when the shortest CPU allowed time is shorter than the CPU recovery time of the C4 state (S620: NO), or when the shortest bus allowed time is shorter than the bus recovery time of the C4 state (S630: NO), the execution mode setting unit 540 proceeds to processing of FIG. 7.

Figure 7:
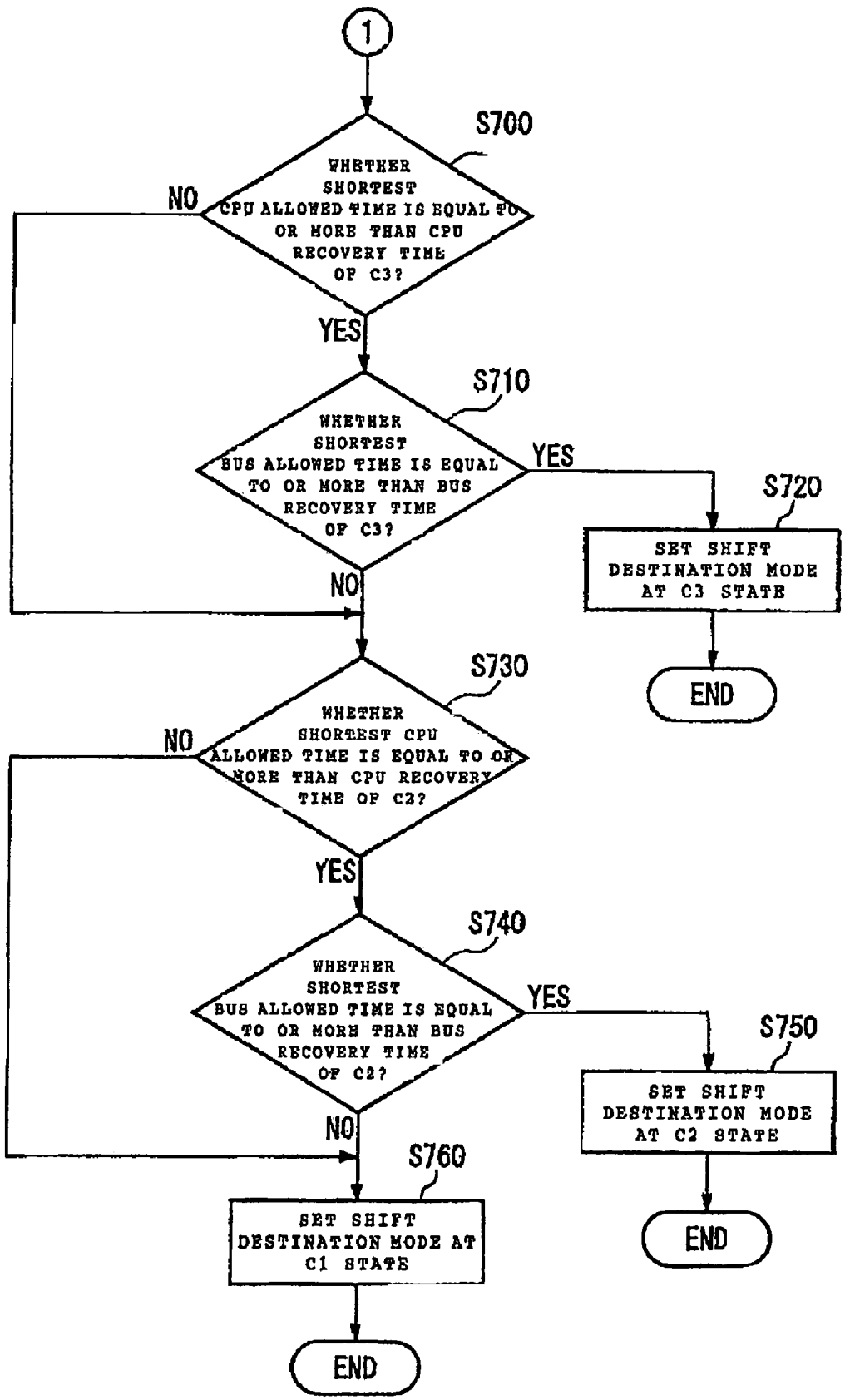
FIG. 7 shows processing subsequent to the processing of FIG. 6.

FIG. 7 shows the processing subsequent to the processing of FIG. 6. The execution mode setting unit 540 determines whether or not the shortest CPU allowed time in the plurality of input/output devices is equal to or more than the CPU recovery time of the C3 state (S700). When the CPU allowed time is equal to or more than the CPU recovery time (S700: YES), the execution mode setting unit 540 subsequently determines whether or not the shortest bus allowed time in the plurality of input/output devices is equal to or more than the bus recovery time of the C3 state (S710).

When the bus allowed time is equal to or more than the bus recovery time (S710: YES), the execution mode setting unit 540 sets the shift destination mode at the C3 state (S720). Meanwhile, when the shortest CPU allowed time is shorter than the CPU recovery time of the C3 state (S700: NO), or when the shortest bus allowed time is shorter than the bus recovery time of C3 state (S710: NO), the execution mode setting unit 540 proceeds to the next processing.

The execution mode setting unit 540 determines whether or not the shortest CPU allowed time in the plurality of input/output devices is equal to or more than the CPU recovery time of the C2 state (S730). When the CPU allowed time is equal to or more than the CPU recovery time (S730: YES), the execution mode setting unit 540 subsequently determines whether or not the shortest bus allowed time in the plurality of input/output devices is equal to or more than the bus recovery time of the C2 state (S740).

When the bus allowed time is equal to or more than the bus recovery time (S740: YES), the execution mode setting unit 540 sets the shift destination mode at the C2 state (S750). Meanwhile, when the shortest CPU allowed time is shorter than the CPU recovery time of the C2 state (S730: NO), or when the shortest bus allowed time is shorter than the bus recovery time of the C2 state (S740: NO), the execution mode setting unit 540 sets the shift destination mode at the C1 state (S760).

Thus, the execution mode setting unit 540 can select a low power mode in which the CPU recovery time is equal to or shorter than the shortest CPU allowed time and the bus recovery time is equal to or shorter than the shortest bus allowed time, and can set the selected low power mode as the shift destination mode. Furthermore, the execution mode setting unit 540 determines in an order from the execution mode of which power consumption is low to the execution mode of which power consumption is high, whether or not the central processing unit 1000 is shiftable thereto, thus making it possible to shift the central processing unit 1000 to the execution mode of which power consumption is as low as possible.

Figure 8:
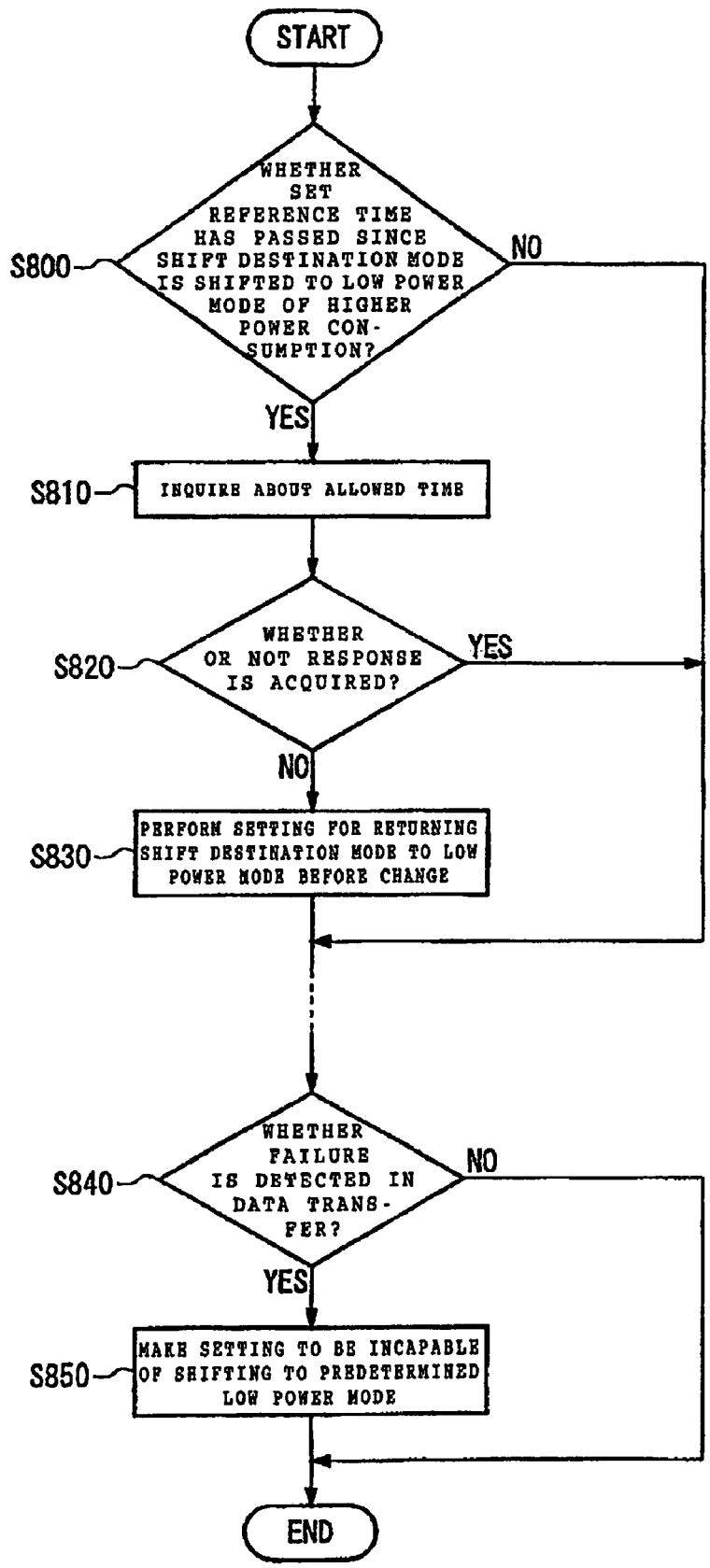
FIG. 8 shows an example of another processing to be performed by the operating system.

FIG. 8 shows an example of another processing to be performed by the operating system. The operating system allows the central processing unit 1000 to perform the following processing, for example, periodically. The allowed time acquisition unit 520 determines whether or not the predetermined set reference time has passed since the execution mode setting unit 540 changed the shift destination mode to the low power mode of which power consumption is higher than that of the low power mode set in the past (S800).

When the set reference time has passed, the allowed time acquisition unit 520 inquires about the CPU allowed time and bus allowed time of each input/output device (S810). The allowed time acquisition unit 520 moves the processing to S840 when acquiring a response to the inquiry concerned (S820: YES). Note that the response may be the CPU allowed time itself and the bus allowed time itself, or may be a notice to the effect that these times have been written into the main memory 1020.

Meanwhile, when the execution mode setting unit 540 cannot acquire the response to the inquiry concerned (S820: NO), the execution mode setting unit 540 makes a setting of returning the shift destination mode to the low power mode before the change (S830). For example, from the main memory, the execution mode setting unit 540 may take out the low power mode before the change, which is stored in S640, and may set the taken-out low power mode as the shift destination mode. Thus, even when a failure occurs in the device driver and the CPU allowed time and the bus allowed time become inaccurate, the power consumption of the information processing apparatus 10 can be maintained low.

Subsequently, the operating system performs the following processing periodically. Note that timing of the processing may differ from that of the above-mentioned processing. When any of the input/output devices requests the data transfer to be performed with the main memory in any of the low power modes, the failure detection unit 530 determines whether or not a failure has occurred in the data transfer (S840). When it is determined that the failure has occurred in the data transfer (S840: YES), the execution mode setting unit 540 sets the central processing unit 1000 so as not to be shiftable to a predetermined low power mode, for example, the C3 state (S850).

Figure 9:
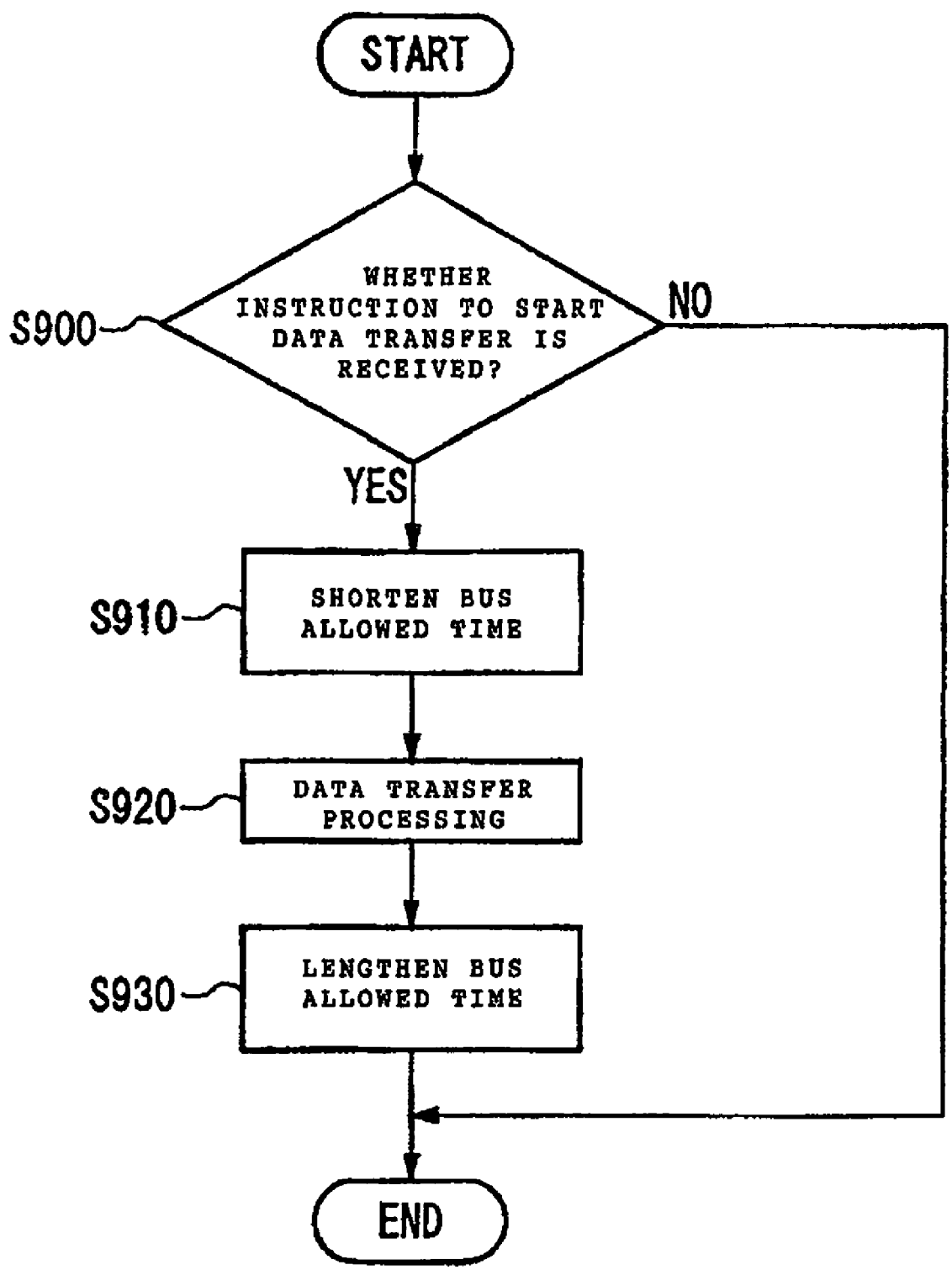
FIG. 9 shows an example of an operation flow of a device driver A.

FIG. 9 shows an example of an operation flow of the device driver A. The device driver A allows the allowed time creating unit 500-1 to perform the following processing, for example, periodically. The allowed time creating unit 500-1 determines whether or not to have received a transfer start instruction to start the data transfer with the main memory (S900). In the case of having received the transfer start instruction (S900: YES), the allowed time creating unit 500-1 stores, as a new bus allowed time, a time shorter than the bus allowed time stored in the device information recording unit 310, in the device information recording unit 310, thus shortening the bus allowed time (S910).

Then, the allowed time creating unit 500-1 performs the data transfer by the device A (S920). After the data transfer is finished, the allowed time creating unit 500-1 stores, as a new bus allowed time, a time longer than the bus allowed time stored in S910, in the device information recording unit 310, thus lengthening the bus allowed time (S930). As a result of this, when the device A transfers data with the main memory, the allowed time creating unit 500-1 can set a shorter time as the bus allowed time as compared with the case where the device A does not transfer data with the main memory.

In place of this, the allowed time creating unit 500-1 may shorten the CPU allowed time, and after the end of the data transfer, may lengthen the CPU allowed time. Alternatively, the allowed time creating unit 500-1 may set the bus allowed time or the CPU allowed time in response to a transfer rate of the data transfer. For example, when the transfer rate of the data transfer is rapid, the allowed time creating unit 500-1 may create, as the bus allowed time, a time shorter than a time of the case where the transfer rate is slower.

As described above, according to this embodiment, the central processing unit 1000 can be operated at the execution mode of which power consumption is as low as possible, and failure can be prevented from occurring in the input/output devices.

Figure 10:
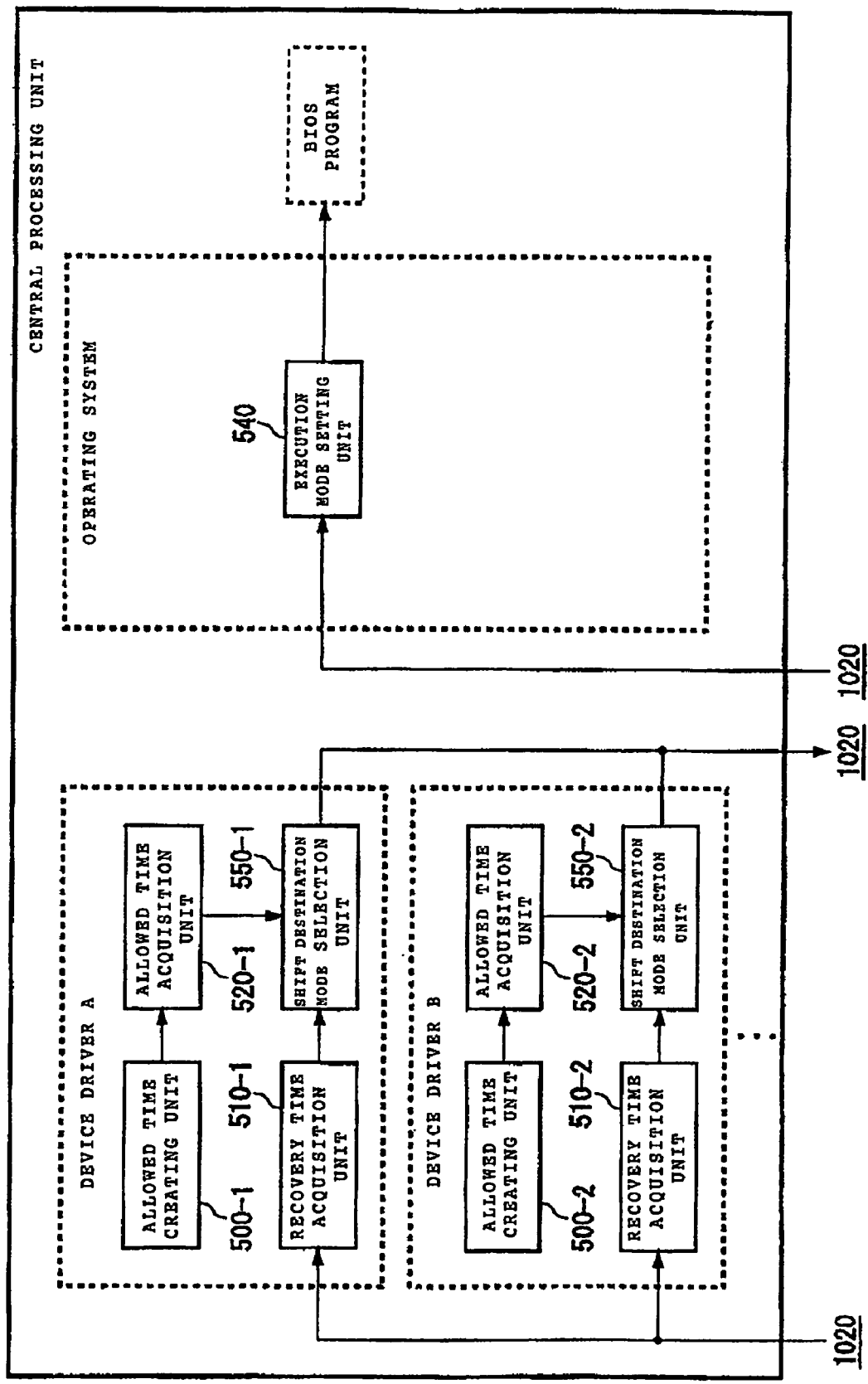
FIG. 10 shows a block diagram of a central processing unit 1000 in a modification example.

FIG. 10 shows a block diagram of a central processing unit 1000 in a modification example. Unlike the central processing unit 1000 described in FIG. 5, the central processing unit 1000 of this modification example functions as an allowed time creating unit 500-1, a recovery time acquisition unit 510-1, an allowed time acquisition unit 520-1 and a shift destination mode selection unit 550-1 by a device driver A. Moreover, the central processing unit 1000 functions as an allowed time creating unit 500-2, a recovery time acquisition unit 510-2, an allowed time acquisition unit 520-2 and a shift destination mode selection unit 550-2 by a device driver B. The allowed time creating unit 500-1, the recovery time acquisition unit 510-1 and the allowed time acquisition unit 520-1 in FIG. 10 are approximately the same as the allowed time creating unit 500-1, the recovery time acquisition unit 510 and the allowed time acquisition unit 520, which are shown in FIG. 5, respectively, and accordingly, description thereof is omitted.

Moreover, the central processing unit 1000 functions as an execution mode setting unit 540 by a power saving module of the operating system. Note that, as in FIG. 5, the device driver A is a program for managing the device A, and the device driver B is a program for managing the device B. Moreover, a set of the operating system, the device driver A and the device driver B is an example of a program according to the present invention.

Based on the CPU recovery time and the like, the shift destination mode selection unit 550-1 selects a shift destination mode to be set by the execution mode setting unit 540 when only the device A is provided as the input/output device in the information processing apparatus 10 and no other input/output devices are provided therein. Then, in the main memory 1020, the shift destination mode selection unit 550-1 stores information indicating the selected shift destination mode such that the information corresponds to the device A. In a similar way, the allowed time creating unit 500-2 and the like select the shift destination mode for each input/output device, and stores each selected shift destination mode in the main memory 1020. Processing of the device drivers of other input/output devices is substantially the same as the processing of the device driver A, and accordingly, subsequent description is omitted.

The execution mode setting unit 540 sets, as the shift destination mode, a low power mode in which the CPU recovery time is the shortest and the bus recovery time is the shortest in the shift destination modes selected for each of the input/output devices by the shift destination mode selection unit 550-1 and the like. An example of setting processing is substantially the same as that of FIG. 5, and accordingly, description thereof is omitted.

FIG. 11 shows an example of a device information recording unit 310 in the modification example. The device information recording unit 310 stores a shift destination mode to be set by the execution mode setting unit 540 for each input/output device when only the input/output device is provided in the information processing apparatus 10. In place of this, the device information recording unit 310 may store, for each input/output device and execution mode, information as to whether the execution mode setting unit 540 is to perform a shiftable setting to the execution mode when only the input/output device is provided in the information processing apparatus 10. Note that a CPU information recording unit 300 in this example is substantially the same as the CPU information recording unit 300 shown in FIG. 3, and description thereof is omitted.

Figure 12:
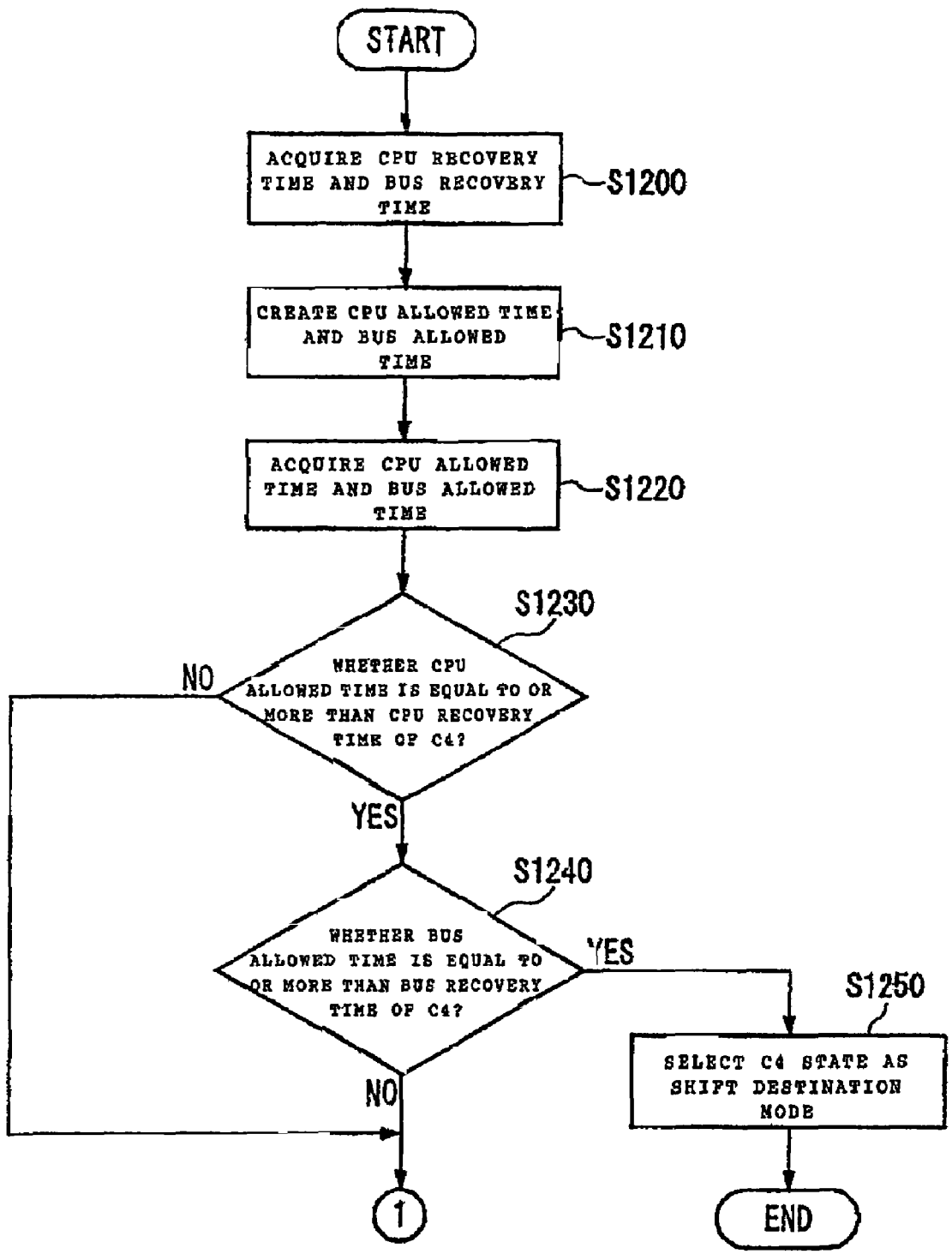
FIG. 12 shows an example of an operation flow of a device driver A in the modification example.

FIG. 12 shows an example of an operation flow of the device driver A in the modification example. The device driver A allows the following units to perform the following processing, for example, periodically or every time when the operating state of the device A is changed. First, the recovery time acquisition unit 510-1 acquires the CPU recovery time and the bus recovery time (S1200). The allowed time creating unit 500-1 creates the CPU allowed time and bus allowed time of the device A (S1210). The allowed time acquisition unit 520-1 acquires the CPU allowed time and bus allowed time of the device A from the allowed time crating unit 500-1 (S1220).

The shift destination mode selection unit 550-1 determines whether or not the CPU allowed time of the device A is equal to or more than the CPU recovery time of the C4 state (S1230). When the CPU allowed time is equal to or more than the CPU recovery time (S 1230: YES), the shift destination mode selection unit 550-1 subsequently determines whether or not the bus allowed time of the device A is equal to or more than the bus recovery time of the C4 state (S1240).

When the bus allowed time is equal to or more than the bus recovery time (S1240: YES), the shift destination mode selection unit 550-1 selects the C4 state as the shift destination mode, and stores the result of the selection in the device information recording unit 310 (S1250). Meanwhile, when the CPU allowed time of the device A is shorter than the CPU recovery time of the C4 state (S1230: NO), or when the bus allowed time of the device A is shorter than the bus recovery time of the C4 state (S1240: NO), the shift destination mode selection unit 550-1 proceeds to processing of FIG. 13.

Figure 13:
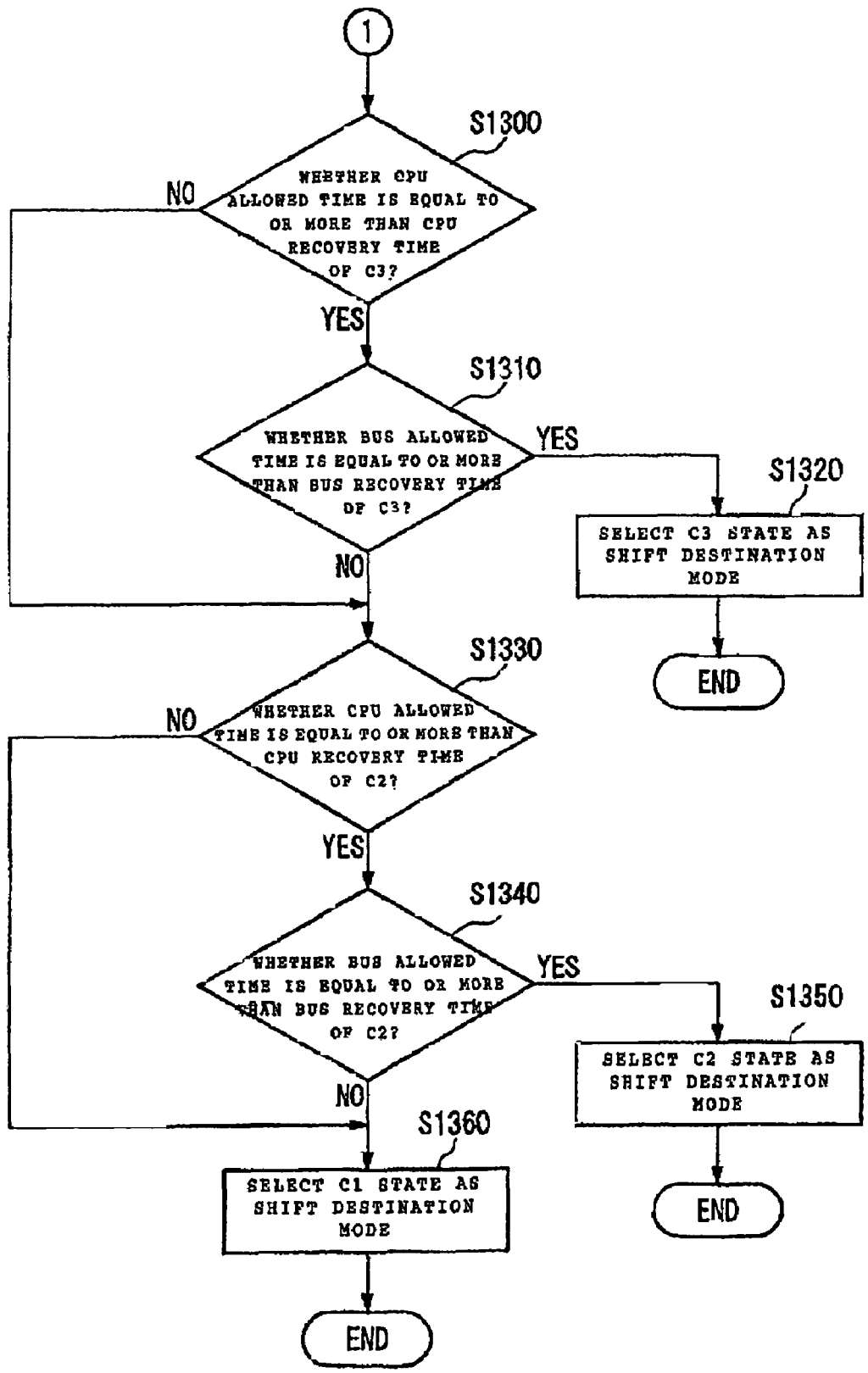
FIG. 13 shows processing subsequent to the processing of FIG. 12.

FIG. 13 shows the processing subsequent to the processing of FIG. 12. The shift destination mode selection unit 550-1 determines whether or not the CPU allowed time of the device A is equal to or more than the CPU recovery time of the C3 state (S1300). When the CPU allowed time is equal to or more than the CPU recovery time (S1300: YES), the shift destination mode selection unit 550-1 subsequently determines whether or not the bus allowed time of the device A is equal to or more than the bus recovery time of the C3 state (S1310).

When the bus allowed time is equal to or more than the bus recovery time (S1310: YES), the shift destination mode selection unit 550-1 selects the C3 state as the shift destination mode, and stores the result of the selection in the device information recording unit 310 (S1320). Meanwhile, when the CPU allowed time of the device A is shorter than the CPU recovery time of the C3 state (S1300: NO), or when the bus allowed time of the device A is shorter than the bus recovery time of the C3 state (S1310: NO), the shift destination mode selection unit 550-1 proceeds to the next processing.

The shift destination mode selection unit 550-1 determines whether or not the CPU allowed time of the device A is equal to or more than the CPU recovery time of the C2 state (S1330). When the CPU allowed time is equal to or more than the CPU recovery time (S1330: YES), the shift destination mode selection unit 550-1 subsequently determines whether or not the bus allowed time of the device A is equal to or more than the bus recovery time of the C2 state (S1340).

When the bus allowed time is equal to or more than the bus recovery time (S1340: YES), the shift destination mode selection unit 550-1 selects the C2 state as the shift destination mode, and stores the result of the selection in the device information recording unit 310 (S1350). Meanwhile, when the bus allowed time of the device A is shorter than the bus recovery time of the C2 state (S1330: NO), or when the bus allowed time of the device A is shorter than the bus recovery time of the C2 state (S1340: NO), the shift destination mode selection unit 550-1 selects the C1 state as the shift destination mode, and stores the result of the selection in the device information recording unit 310 (S1360).

Figure 14:
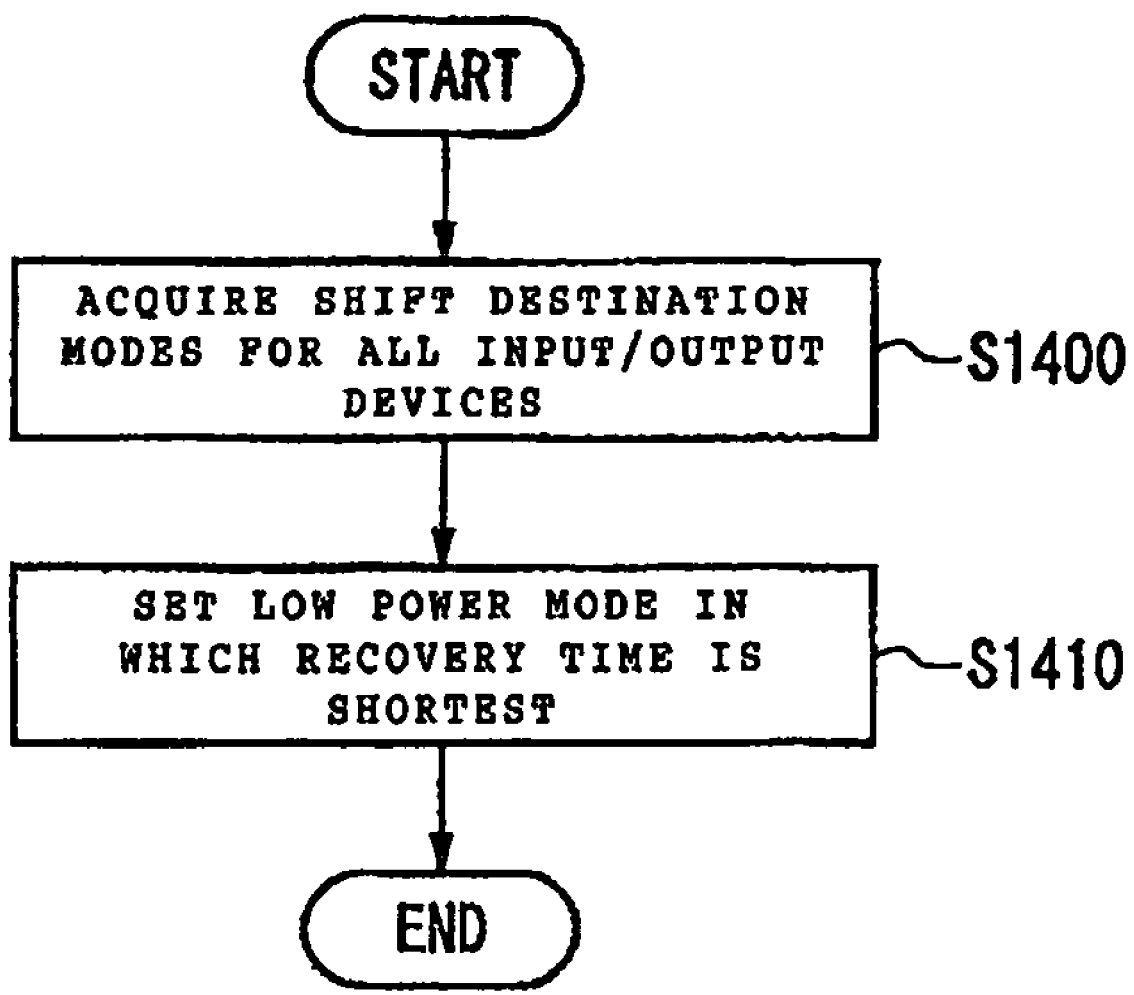
FIG. 14 shows an example of processing of an operating system in the modification example.

FIG. 14 shows an example of processing of the operating system in the modification example. The execution mode setting unit 540 acquires the shift destination modes for all of the input/output devices from the device information recording unit 310 (S1400). Then, the execution mode setting unit 540 sets, as the shift destination mode, a low power mode in which the CPU recovery time is the shortest and the bus recovery time is the shortest in the shift destination modes selected by the shift destination mode selection unit 550-1 and the like for each of the input/output devices (S1410).

As described above, according to this modification example, the input/output devices can be appropriately operated by functions of the device drivers with little change in functions of the existing operating system.

As above, the present invention has been described by use of the embodiment, however, the technical scope of the present invention is not limited to the scope described in the above-described embodiment. It is apparent for those skilled in the art that a variety of alterations or modifications can be added to the above-described embodiment. It is apparent from the description of the scope of claims that an aspect added with such alterations or modifications can also be incorporated in the technical scope of the present invention.

According to the embodiment described above, programs, a recording medium, control methods, and information processing apparatuses, which are described in the respective items below, are realized.

Although the preferred embodiment of the present invention has been described in detail, it should be understood that various changes, substitutions and alterations can be made therein without departing from spirit and scope of the inventions as defined by the appended claims.

What is claimed is:

1. A program product, for use with an information processing apparatus, for directing the information processing apparatus to control an execution mode of a central processing unit provided in the information processing apparatus, the central processing unit having a plurality of execution modes, whose types and power consumptions of executable processing are different from one another, the program product comprising:

an apparatus readable medium;
recovery time acquisition means, provided on the apparatus-readable medium, for acquiring a recovery time which is a time required for the central processing unit to recover from a low power mode to a high power mode of which power consumption is higher than that of the low power mode;
allowed time acquisition means, provided on the apparatus-readable medium, for acquiring the longest allowed time from a request for processing unprocessable in the low power mode and processable in the high power mode to a start of the processing after the central processing unit recovers to the high power mode, the request being made by an input/output device of the information processing apparatus to the central processing unit; and
execution mode setting means, provided on the apparatus-readable medium, for setting the central processing unit in a state of being shiftable to the low power mode, on condition that it is determined that the central processing unit is able to shift to the low power mode based on the allowed time and the recovery time.

2. The program product according to claim 1,
wherein the central processing unit executes an instruction in the high power mode, and does not execute the instruction in the low power mode,
the allowed time acquisition means acquires a CPU allowed time which is the longest allowed time from a request for execution of the instruction, the request being made by the input/output device to the central processing unit, to a start of the execution of the instruction by the central processing unit, and
the execution mode setting means sets the central processing unit in the state of being shiftable to the low power mode on condition that the recovery time is shorter than the CPU allowed time.

3. The program product according to claim 1,
wherein the central processing unit has a cache memory, performs, in the high power mode, coherency control which is processing for keeping coherency between the cache memory and a main memory, and does not perform the coherency control in the low power mode,
the allowed time acquisition means acquires a bus allowed time which is the longest allowed time from a request by the input/output device for an access to the main memory of the information processing apparatus to a state where the central processing unit can perform the coherency control, and
the execution mode setting means sets the central processing unit in the state of being shiftable to the low power mode on condition that the recovery time is shorter than the bus allowed time.

4. The program product according to claim 3,
wherein the central processing unit executes an instruction in the high power mode, and does not execute the instruction in the low power mode,
the allowed time acquisition means further acquires a CPU allowed time which is the longest allowed time from a request for execution of the instruction, the request being made by the input/output device to the central processing unit, to a start of the execution of the instruction by the central processing unit, and
the execution mode setting means sets the central processing unit in the state of being shiftable to the low power mode further on condition that the recovery time is shorter than the CPU allowed time.

5. The program product according to claim 1,
wherein the central processing unit shifts from the high power mode to any of a plurality of the low power modes of which power consumptions are mutually different,
the recovery time acquisition means acquires a recovery time required for the central processing unit to recover from each of the plurality of low power modes to the high power mode, and
the execution mode setting means selects and sets a low power mode of which recovery time is shorter than the allowed time and of which power consumption is lowest in the plurality of low power modes as a low power mode of a shift destination to which the central processing unit shifts from the high power mode.

6. The program product according to claim 5,
wherein the information processing apparatus includes a plurality of input/output devices,
the allowed time acquisition means acquires the allowed time of each of the plurality of input/output devices, and
the execution mode setting means selects and sets a low power mode of which recovery time is shorter than the shortest allowed time acquired by the allowed time acquisition means and of which power consumption is lowest as the low power mode of the shift destination to which the central processing unit shifts from the high power mode.

7. The program product according to claim 5,
wherein, on condition that a predetermined set reference time has passed since the low power mode of the shift destination was changed to a low power mode of which power consumption was higher than power consumption of a low power mode set in the past, the execution mode setting means performs a setting of returning the low power mode of the shift destination to the low power mode before the change.

8. The program product according to claim 7,
wherein, on condition that the predetermined set reference time has passed since the low power mode of the shift destination was changed by the execution mode setting unit to the low power mode of which power consumption was higher than power consumption of the low power mode before the change, the allowed time acquisition unit inquires a device driver for managing the input/output device about the allowed time, and
the execution mode setting means performs a setting of returning the low power mode of the shift destination to the low power mode before the change on condition that there is no response to the inquiry.

9. The program product according to claim 1,
wherein the central processing unit shifts from the high power mode to any of a plurality of the low power modes of which power consumptions are mutually different,
the information processing apparatus includes a plurality of input/output devices,
the recovery time acquisition means acquires a recovery time required for the central processing unit to recover from each of the plurality of low power modes to the high power mode,
the allowed time acquisition means acquires the allowed time of each of the plurality of input/output devices,
the program product further comprises shift destination mode selection means, provided on the apparatus-readable medium, for selecting, for each of the input/output devices, a low power mode of a shift destination to be set by the execution mode setting means on condition that only the input/output device is provided in the information processing apparatus, based on the allowed time and the recovery time, and
the execution mode setting means sets, as the low power mode of the shift destination, a low power mode of which recovery time is shortest in the low power modes of the shift destinations selected for each of the input/output devices by the shift destination mode selection means.

10. The program product according to claim 1,
wherein the program product further comprises allowed time creating means, provided on the apparatus-readable medium, for creating the allowed time of the input/output device based on an operating state of the input/output device, and
the allowed time acquisition means acquires the allowed time from the allowed time creating means.

11. The program product according to claim 10,
wherein, on condition that the input/output device transfers data with a main memory, the allowed time creating means creates, as the allowed time, a shorter time than in a case where the input/output device does not transfer the data with the main memory.

12. A program product, for use with an information processing apparatus, for directing the information processing apparatus to control a central processing unit of the information processing apparatus to operate in any of a plurality of execution modes, whose types and power consumptions of executable processing are different from one another, wherein the central processing unit shifts from a high power mode to any of a plurality of low power modes which are execution modes of lower power consumptions than that of the high power mode, the program product comprising:
an apparatus readable medium;
recovery time acquisition means, provided on the apparatus-readable medium, for acquiring a recovery time which is a time required for the central processing unit to recover from each of the plurality of low power modes to the high power mode;
allowed time acquisition means, provided on the apparatus-readable medium, for acquiring the longest allowed time from a request for processing, which is unprocessable in each of the plurality of low power modes and processable in the high power mode, to a start of the processing after the central processing unit recovers to the high power mode, the request being made by an input/output device of the information processing apparatus to the central processing unit; and
shift destination mode selection means, provided on the apparatus-readable medium, for selecting the low power mode of a shift destination, to which the central processing unit is to shift, based on the allowed time and the recovery time, on condition that the input/output device is provided in the information processing apparatus and other input/output device is not provided, and for outputting information indicating the selected low power mode.

13. A control method for controlling an execution mode of a central processing unit provided in an information processing apparatus,
wherein the central processing unit has a plurality of execution modes, whose types and power consumptions of executable processing are different from one another,
the method comprising the steps of:
acquiring a recovery time which is a time required for the central processing unit to recover from a low power mode to a high power mode which is an execution mode of higher power consumption than that of the low power mode;
acquiring the longest allowed time from a request for processing unprocessable in the low power mode and processable in the high power mode to a start of the processing after the central processing unit recovers to the high power mode, the request being made by an input/output device of the information processing apparatus to the central processing unit; and
setting the central processing unit in a state of being shiftable to the low power mode, on condition that it is determined that the central processing unit is able to shift to the low power mode based on the allowed time and the recovery time.

14. A control method for controlling a central processing unit of an information processing apparatus to operate in any of a plurality of execution modes, whose types and power consumptions of executable processing are different from one another,
wherein the central processing unit shifts from a high power mode to any of a plurality of low power modes which are execution modes of lower power consumptions than that of the high power mode,
the method comprising the steps of:
acquiring a recovery time which is a time required for the central processing unit to recover from each of the plurality of low power modes to the high power mode;
acquiring the longest allowed time from a request for processing unprocessable in each of the plurality of low power modes and processable in the high power mode to a start of the processing after the central processing unit recovers to the high power mode, the request being made by an input/output device of the information processing apparatus to the central processing unit;
selecting, based on the allowed time and the recovery time, a shift destination low power mode to which the central processing unit is to shift on condition that the input/output device is provided in the information processing apparatus and other input/output device is not provided; and
outputting information indicating the selected low power mode.

15. An information processing apparatus comprising:
a central processing unit having a plurality of execution modes, whose types and power consumptions of executable processing are different from one another;
an input/output device;
recovery time acquisition means for acquiring a recovery time which is a time required for the central processing unit to recover from a low power mode to a high power mode which is an execution mode of higher power consumption than that of the low power mode;
allowed time acquisition means for acquiring the longest allowed time from a request for processing unprocessable in the low power mode and processable in the high power mode to a start of the processing after the central processing unit recovers to the high power mode, the request being made by the input/output device of the information processing apparatus to the central processing unit; and
execution mode setting means for setting, the central processing unit in a state of being shiftable to the low power mode, on condition that it is determined that the central processing unit is able to shift to the low power mode based on the allowed time and the recovery time.

* * * * *